Figure 1:
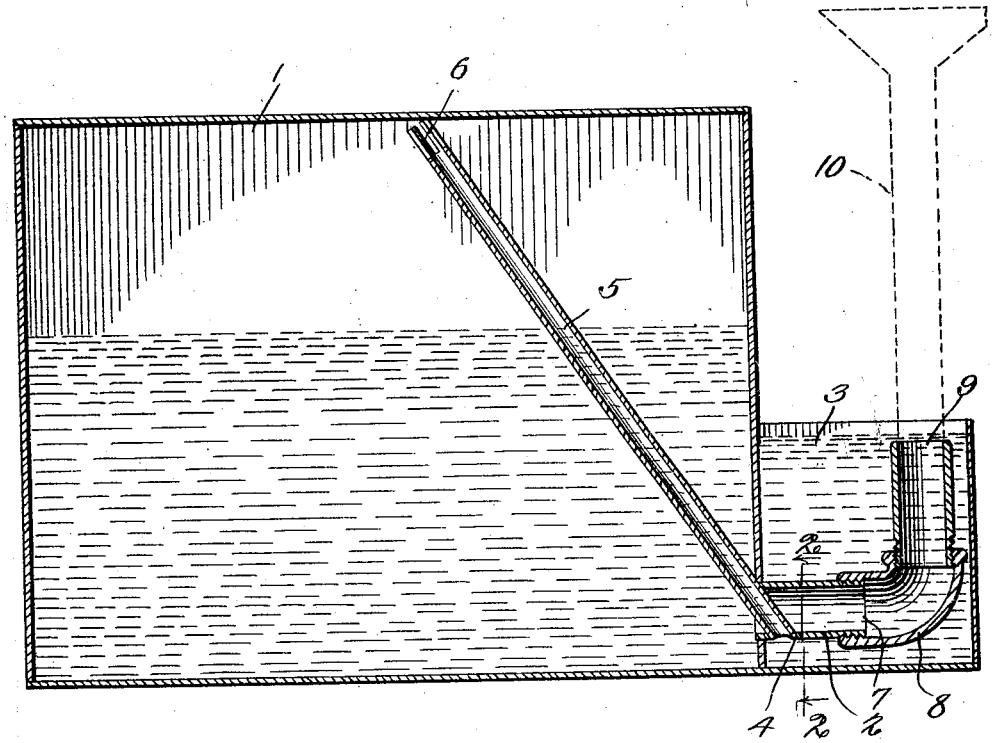
Figure 2:
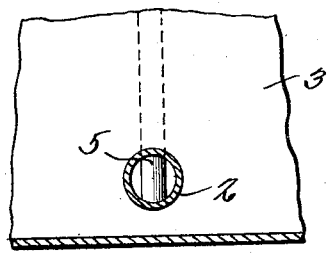

Nov. 23, 1926.

C. STIFLE 1,608,346

STOCK WATERER

Filed April 22, 1925

Clarence Stifle
Inventor,

By C. A. Snow & Co.
Attorneys.

Patented Nov. 23, 1926.

1,608,346

UNITED STATES PATENT OFFICE.

CLARENCE STIFLE, OF ROBINSON, ILLINOIS.

STOCK WATERER.

Application filed April 22, 1925. Serial No. 25,066.

This invention relates to stock waterers of the self feeding type.

The object of the invention is to provide a watering trough for stock, poultry or the like so constructed that the same pipe which is used for supplying water to the drinking cup may be employed for filling the receptacle, the construction of the apparatus being such that the air is forced out of the tank while it is being filled.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

The accompanying drawing represents a central vertical section of an apparatus constructed in accordance with this invention.

In the embodiment illustrated a tank 1 is shown which may be of any desired size according to the quantity of water to be held and which is closed throughout airtight except at the lower front portion thereof where a pipe 2 is inserted and designed to be used both for filling the tank and as an outlet therefor to discharge the water into the drinking cup 3 secured to the outer front wall of said tank.

The pipe 2 has an opening 4 in its lower wall adjacent its connection with the tank which is surrounded by a tube 5 which extends obliquely through pipe 2 into the tank 1 to a point near the top thereof. This tube 5 which is designed to permit air in the tank to be forced out therethrough is preferably slotted at its upper end as shown at 6 to provide for the passage of the air to the tube.

The pipe 2 which is subtantially L-shaped is here shown made of three sections 7, 8 and 9 having threaded engagement to permit their being disassembled when necessary. The section 9 extends to a point near the top of the cup 3 and is designed to have a large funnel 10 inserted therein when the tank 1 is to be filled.

As the water enters the tank 1 through the pipe 2 it forces the air upward to the top of the tank which passes down out through tube 5 and through the opening 4 in the bottom wall of pipe 2 into the drinking cup 3.

From the above it will be seen that one pipe only is required for filling as well as for emptying the tank and which dispenses entirely with any valve or gasket which frequently cause trouble by leakage.

Water enters cup 3 through the pipe 2, and it will be obvious that when the water falls below the lower end of pipe 5, air will be admitted to the tank 1, allowing water to pass into pipe 2 and overflow into the cup 3.

I claim:—

A drinking fountain embodying a closed tank, a drinking cup on the outer face of the tank, a pipe extending into the cup and having communication with the interior of the tank to supply fluid to the cup, an inclined pipe having its lower end extending through the first mentioned pipe, and said last mentioned pipe having its upper end disposed adjacent to the upper end of the tank.

In testimony that I claim the foregoing as my own, I have hereto affixed my signature.

CLARENCE STIFLE.